(12) United States Patent
Dick et al.

(10) Patent No.: US 7,809,075 B2
(45) Date of Patent: Oct. 5, 2010

(54) MIMO SYMBOL DETECTION FOR SNR HIGHER AND LOWER THAN A THRESHOLD

(75) Inventors: Christopher H. Dick, San Jose, CA (US); Kiarash Amiri, Houston, TX (US); Raghavendar Mysore Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 232 days.

(21) Appl. No.: 12/193,106

(22) Filed: Aug. 18, 2008

(65) Prior Publication Data

US 2010/0040177 A1 Feb. 18, 2010

(51) Int. Cl.
*H04B 7/02* (2006.01)
*H04L 1/02* (2006.01)
(52) U.S. Cl. .................. 375/267; 375/341; 375/347
(58) Field of Classification Search ............... 375/267, 375/341, 347
See application file for complete search history.

(56) References Cited

U.S. PATENT DOCUMENTS

| 7,245,666 B1 | 7/2007 | Gardner et al. | |
| 2006/0148506 A1 | 7/2006 | Hoo | |
| 2009/0196379 A1* | 8/2009 | Gan et al. | 375/340 |

FOREIGN PATENT DOCUMENTS

WO  WO 2008/027554 A3  3/2008

OTHER PUBLICATIONS

Chin, W. H., "QRD Based Tree Search Data Detection for MIMO Communication System," *Proc. of the IEEE 61st Semiannual Vehicular Technology Conference*, May 30-Jun. 1, 2005, pp. 1624-1627, vol. 3, Stockholm, Sweden.

Detert, Thorben, "An Efficient Fixed Complexity QRD-M Algorithm for MIMO-OFDM using Per-Survivor Slicing," *Proc. of the 4th IEEE Int'l. Symposium on Wireless Communication Systems*, Oct. 16-19, 2007, pp. 572-576, Trondheim, Norway.

(Continued)

*Primary Examiner*—Curtis B Odom
(74) *Attorney, Agent, or Firm*—LeRoy D. Maunu; Lois D. Cartier (57) ABSTRACT

A system detects symbols communicated from multiple transmitting antennas to multiple receiving antennas. A first detector determines the symbols from respective partial distances of potential choices for symbols from a constellation. A second detector determines the symbols from respective partial distances of more potential choices. The first and second detectors determine their partial distances from signals received at the receiving antennas. The second detector has a lower bit error rate than the first detector. The potential choices for the second antenna are smaller than the potential choices for the first antenna in response to a signal-to-noise ratio (SNR) being higher than a threshold. An evaluator estimates the SNR of the signals received at the receiving antennas. The evaluator enables the first detector in response to the SNR being lower than the threshold, and the evaluator enables the second detector in response to the SNR being higher than the threshold.

18 Claims, 8 Drawing Sheets

OTHER PUBLICATIONS

Amiri, Kiarash et al., "Novel Sort-Free Detector with Modified Real-Valued Decomposition (M-RVD) Ordering in MIMO Systems," *Proc. of the 2008 IEEE Global Telecommunications Conference*, Nov. 30, 2008, pp. 1-5, Piscataway, New Jersey, USA.

Azzam, Luay et al., "Reduced Complexity Sphere Decoding for Square QAM via a New Lattice Representation," *Proc. of the 2007 IEEE Global Telecommunications Conference*, Nov. 1, 2007, pp. 4242-4246, Piscataway, New Jersey, USA.

Azzam, Luay et al., "Reduction of ML Decoding Complexity for MIMO Sphere Decoding, QOSTBC, and OSTBC," *Proc. of the 2008 Information Theory and Applications Workshop*, Jan. 27, 2008, pp. 18-25, Piscataway, New Jersey, USA.

Chen, Sizhong et al., "Relaxed K-Best MIMO Signal Detector Design and VLSI Implementation," *IEEE Transactions on Very Large Scale Integration (VLSI) Systems*, Mar. 2007, pp. 328-337, vol. 15, No. 3.

Kawai, Hiroyuki et al., "Independent Adaptive Control of Surviving Symbol Replica Candidates at Each Stage Based on Minimum Branch Metric in QRM-MLD for OFCDM MIMO Multiplexing," *Proc. of the 2004 IEEE 60th Vehicular Technology Conference*, Sep. 26, 2004, pp. 1558-1564, vol. 3, Piscataway, New Jersey, USA.

Lin, Hsin-Lei et al., "A High-Speed SDM-MIMO Decoder Using Efficient Candidate Searching for Wireless Communication," *IEEE Transactions on Circuits and Systems—II: Express Briefs*, Mar. 2008, pp. 289-293, vol. 55, No. 3.

Mondal, Sudip, "A Novel Approach for K-Best MIMO Detection and its VLSI Implementation," *Proc. of the 2008 IEEE International Symposium on Circuits and Systems*, May 18, 2008, pp. 936-939, Piscataway, New Jersey, USA.

Myllylä, Markus et al., "Implementation Aspects of List Sphere Detector Algorithms," *Proc. of the 2007 IEEE Global Telecommunications Conference*, Nov. 1, 2007, pp. 3915-3920, Piscataway, New Jersey, USA.

Myllylä, Markus et al., "A List Sphere Detector Based on Dijkstra's Algorithm for MIMO-OFDM Systems," *Proc. of the 2007 IEEE 18th Annual Symposium on Personal, Indoor and Mobile Radio Communications*, Sep. 1, 2007, pp. 1-5, Piscataway, New Jersey, USA.

Wu, Yi Hsuan, "Early-Pruned K-Best Sphere Decoding Algorithm Based on Radius Constraints," *Proc. of the 2008 IEEE International Conference on Communications*, May 19, 2008, pp. 4496-4500, Piscataway, New Jersey, USA.

Huang, Liang et al.; "Better k-best Parsing"; Proceedings of the Ninth International Workshop on Parsing Technologies (IWPT); Oct. 2005; Copyright 2005 Association for Computational Linguistic; pp. 53-64.

Guo, Zhan et al.; "A Low Complexity Soft-Output MIMO Decoding Algorithm"; Advances in Wired and Wireless Communication; IEEE/Sarnoff Symposium; 2005 IEEE; pp. 90-93.

Wong, Kwan-wei et al.; "A VLSI Architecture of a K-Best Lattice Decoding Algorithm for MIMO Channels"; Circuits and Systems; 2002; ISCA 2002; IEEE International Symposium; Copyright 2002 IEEE; pp. III-273-III-276.

Damen, Mohamed Oussama et al.; "On Maximum-Likelihood Detection and the Search for the closest Lattice Point"; IEEE Transactions on Information Theory; vol. 49, No. 10; Oct. 2003; pp. 2389-2402.

Burg, Andreas et al.; "VLSI Implementation of MIMO Detection Using the Sphere Decoding Algorithm"; IEEE Journal of Solid-State Circuits; vol. 40, No. 7; Jul. 2005; Copyright 2005 IEEE; pp. 1566-1577.

Amiri, Kiarash et al.; "FPGA Implementation of Dynamic Threshold Sphere Detection for MIMO Systems"; 40th Asilomar Conference on Signals, Systems, and Computers; Nov. 2006; pp. 94-98.

Guo, Zhan et al.; A 53.3 Mb/s 4×4 16-QAM MIMO Decoder in 0.35-μm CMOS; IEEE International Symposium on Circuits and Systems; vol. 5; Copyright 2005 IEEE; May 2005; pp. 4947-4950.

Bengough, Peter A. et al.; "Sorting-Based VLSI Architectures for the *M*-Algorithm and *T*-Algorithm Trellis Decoders"; Copyright 1995 IEEE; IEEE Transactions on Communications, vol. 43, No. 2/3/4, Feb. / Mar. / Apr. 1995; pp. 514-522.

Xilinx, Inc.; U.S. Appl. No. 12/170,468; by Kiarash Amiri et al.; filed Jul. 10, 2008.

Xilinx, Inc.; U.S. Appl. No. 12/045,786; by Kiarash Amiri et al.; filed Mar. 11, 2008.

Xilinx, Inc.; U.S. Appl. No. 12/025,971; by Kiarash Amiri et al.; filed Feb. 5, 2008.

Xilinx, Inc.; U.S. Appl. No. 12/170,474; by Kiarash Amiri et al.; filed Jul. 10, 2008.

\* cited by examiner

MIMO SYMBOL DETECTION FOR SNR HIGHER AND LOWER THAN A THRESHOLD

FIELD OF THE INVENTION

The present invention generally relates to communication to multiple input antennas from multiple output (MIMO) antennas, and more particularly to symbol detection for a MIMO communication system.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actual received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication is increased by transmitting multiple symbols in parallel from multiple transmitting antennas. The detection of the multiple transmitted symbols improves by receiving the symbols with multiple receiving antennas. For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

Various embodiments of the invention provide a system for detecting symbols communicated from multiple transmitting antennas to multiple receiving antennas. A first detector determines the symbols from respective partial distances of potential choices of one or more of the symbols from a constellation. A second detector determines the symbols from respective partial distances of more potential choices. The first and second detectors determine their partial distances from signals received at the receiving antennas. A bit error rate of the second detector is less than a bit error rate of the first detector. The potential choices for the second antenna are smaller than the potential choices for the first antenna in response to a signal-to-noise ratio (SNR) being higher than a threshold. An evaluator is coupled to the first and second detectors. The evaluator estimates the SNR of the signals received at the receiving antennas. The evaluator enables the first detector in response to the SNR being lower than the threshold, and the evaluator enables the second detector in response to the SNR being higher than the threshold.

Various other embodiments of the invention provide a processor-readable device configured with instructions for generating configuration data for a programmable integrated circuit. Execution of the instructions by a processor causes the processor to generate the configuration data that configures the programmable integrated circuit to implement first and second detectors. The first detector determines the symbols from respective partial distances of potential choices of one or more of the symbols from a constellation. The first detector determines the respective partial distances from signals received at the receiving antennas. The first detector is enabled to determine the symbols in response to a SNR of the signals being lower than a threshold. The second detector determines the symbols from respective partial distances of more potential choices. The second detector determines the respective partial distances from the signals. The second detector is enabled to determine the symbols in response to the SNR being higher than the threshold. A bit error rate of the second detector is less than a bit error rate of the first detector, and the potential choices for the second detector are smaller than the potential choices for the first detector in response to the SNR being higher than the threshold.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
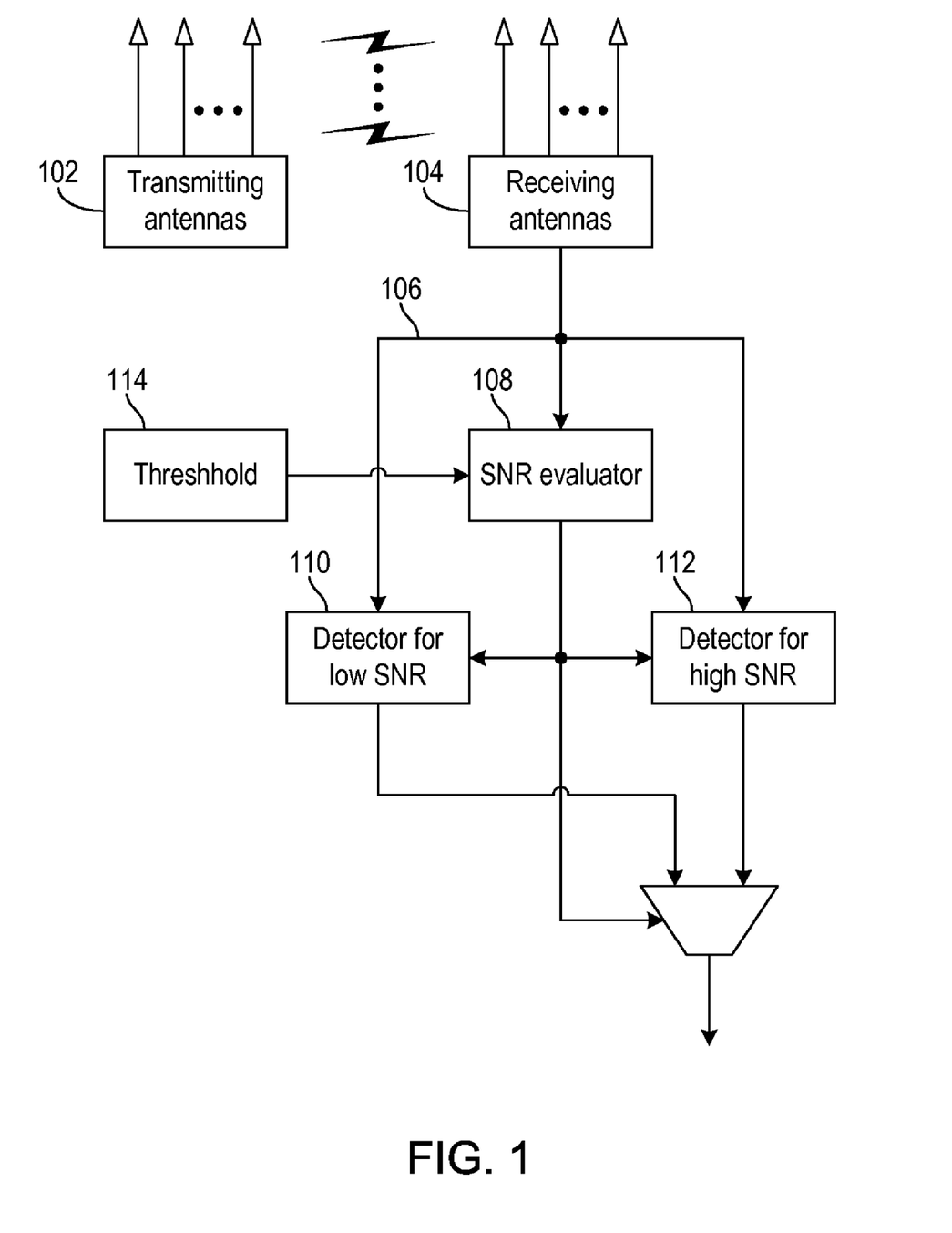
FIG. 1 is a block diagram of a system for detecting symbols in accordance with various embodiments of the invention.

FIG. 1 is a block diagram of a system for detecting symbols in accordance with various embodiments of the invention. Multiple transmitting antennas 102 transmit respective symbols in parallel to multiple receiving antennas 104. Each of the receiving antennas 104 receives a weighted sum of the respective symbols transmitted from the transmitting antennas 102.

A model for the communication channel between the transmitting antennas 102 and the receiving antennas 104 is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

In one embodiment, the channel matrix is decomposed into a triangular matrix. The triangular matrix is an upper triangular matrix from a QR decomposition of the channel matrix. The detection of the transmitted symbols includes determining the M symbols in column vector s that minimize the distance norm:

$$D(s) = \|y - Hs\|^2 = \|Q^H y - Rs\|^2 = \sum_{i=M}^{1} \left| y'_i - \sum_{j=i}^{M} R_{ij} s_j \right|^2$$

where H=QR, $QQ^H$=I, and y'=$Q^H$y. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

Various embodiments of the invention detect the transmitted symbols by computing the distance norm for various combinations selected from all combinations of M symbols in the constellation. The M symbols actually transmitted from the M transmitting antennas should match the combination that has the smallest value of the distance norm.

The receiving antennas 104 provide received signals on line 106 to an evaluator 108 and two detectors 110 and 112. The evaluator 108 determines a signal-to-noise ratio (SNR) of the signals on line 106 and compares the SNR with a threshold 114. If the SNR is below the threshold, detector 110 detects the communicated symbols, and if the SNR is above the threshold, detector 112 determines the detected symbols.

In one embodiment, the detector 110 provides a bounded search of the potential choices for the communicated symbols and detector 112 provides an exhaustive search of the potential choices for the communicated symbols. For example, detector 110 is a K-best sphere detector and the detector 112 is a depth-first-search maximum-likelihood detector with pruning.

In one embodiment, evaluator 108 provides means for evaluating the SNR of signals received at the receiving antennas 104. Detectors 110 and 112 provide means for detecting the symbols from the symbols. Detector 110 provides means for detecting the symbols in response to the SNR being lower than a threshold 114, and detector 112 provides means for detecting the symbols in response to the SNR being higher than the threshold 114. A bit error rate of the detector 112 is less than a bit error rate of the detector 110. The detector 112 performs fewer calculations than would the detector 110 in response to the SNR being higher than the threshold, and the detector 110 performs few calculations than would the detector 112 in response to the SNR being lower than the threshold.

Figure 2:
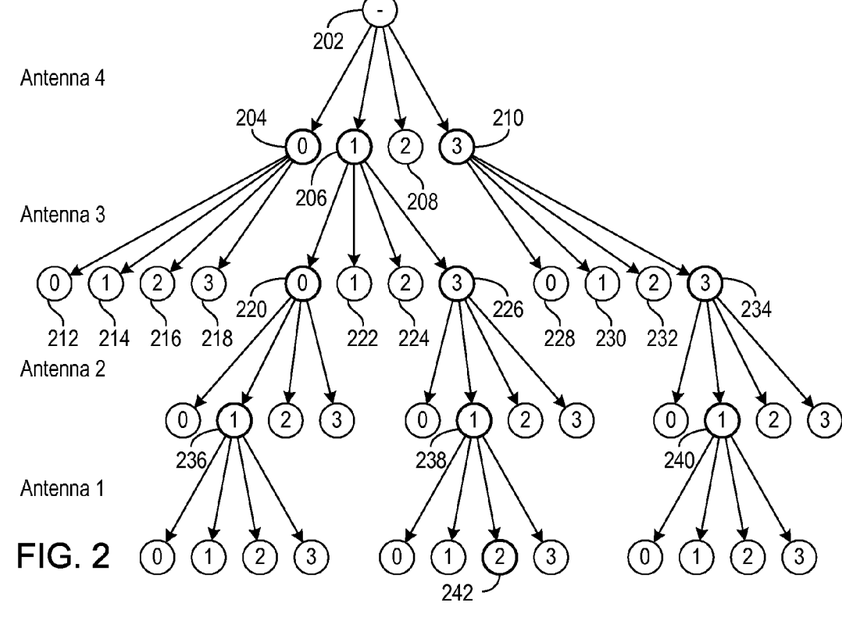
FIG. 2 is a graph diagram illustrating operation of an example K-best sphere detector in accordance with various embodiments of the invention.

FIG. 2 is a graph diagram illustrating operation of an example K-best sphere detector in accordance with various embodiments of the invention. The search of the potential choices for the communicated symbols begins at a root node 202. Each node, except root node 202, is labeled with a symbol that is a potential choice for the symbol transmitted from one of the transmitting antennas.

Because the example constellation includes four symbols, nodes 204, 206, 208, and 210 represent the four potential choices for the symbol transmitted from antenna-4. Partial distances are calculated for these four potential choices as discussed above, and the K (three) best candidates are selected for further examination in this example. Because node 208 has a larger partial distance than nodes 204, 206, and 210, node 208 is pruned and nodes 204, 206, and 210 are expanded further.

Nodes 212, 214, 216, and 218 respectively represent antenna-3 transmitting symbol-0, symbol-1, symbol-2, and symbol-3 in the constellation along with antenna-4 transmitting symbol-0, as represented by expansion node 204. Partial distances are determined for nodes 212, 214, 216, and 218 from the partial distance of node 204 and the signals received at the receiving antennas. Similarly, partial distances are determined for nodes 220, 222, 224, and 226 representing antenna-3 transmitting a symbol in the constellation and antenna-4 transmitting symbol-1, and partial distance are determined for nodes 228, 230, 232, and 234 representing antenna-3 transmitting a constellation symbol and antenna-4 transmitting symbol-3. From nodes 212 through 234, the candidates for further expansion are the three nodes 220, 226, and 234 having the smallest partial distances.

Similarly, the selected candidates for antenna-2 are the nodes 236, 238, and 240 with the smallest partial distances. The final candidate is the node 242 for antenna-1 having the smallest partial distance. The final candidate node 242 can be selected directly from the potential choices for antenna-1, or the K best candidates can be selected first and then the final candidate node 242 can be selected from the K best candidates.

Figure 3:
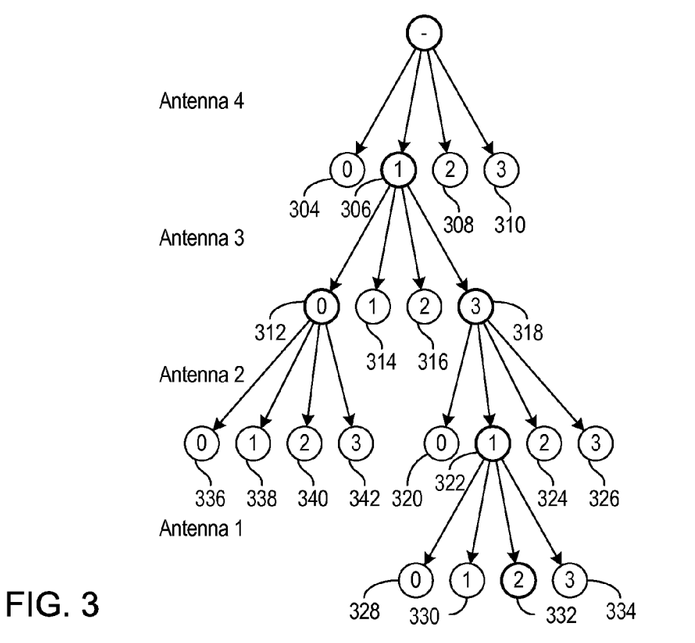
FIG. 3 is a graph diagram illustrating an example depth-first-search maximum-likelihood detector with pruning in accordance with various embodiments of the invention.

FIG. 3 is a graph diagram illustrating an example depth-first-search maximum-likelihood detector with pruning in accordance with various embodiments of the invention. The depth-first-search maximum-likelihood detector can perform an exhaustive search that visits nodes for every possible combination of symbols for the transmitting antennas. However, pruning can reduce the number of nodes actually visited, especially when the first solution found matches the symbols actually transmitted from the transmitting antennas. This first solution is the first leaf node visited in the search tree and likely matches the symbols actually transmitted when signal distortions from noise are low.

Nodes 304, 306, 308, and 310 represent the four potential choices for the symbol transmitted from antenna-4. Node 306 with the smallest partial distance is expanded into nodes 312, 314, 316, and 318 representing antenna-3 respectively transmitting symbol-0, symbol-1, symbol-2, and symbol-3, along with antenna-4 transmitting symbol-1.

Among nodes 312, 314, 316, and 318, node 318 has the smallest partial distance and node 312 has the next smallest partial distance in this example. Node 318 with the smallest partial distance is expanded next into nodes 320, 322, 324, and 326 for antenna-2. Among these nodes, node 322 has the smallest partial distance and is expanded into the nodes 328, 330, 332, and 334. Among these nodes, solution node 332 has the smallest distance and represents antenna-1, antenna-2, antenna-3, and antenna-4 respectively transmitting symbol-2, symbol-1, symbol-3, and symbol-1.

Because node 332 has a smaller distance than nodes 328, 330, and 334, nodes 328, 330, and 334 should not correspond to the symbols actually transmitted. Similarly, node 332 has a smaller distance than the partial distances of nodes 320, 324, and 326 in this example. Thus, nodes 320, 324, and 326 can be pruned even though these nodes are not fully expanded, because the nodes that would result from expanding nodes 320, 324, and 326 would have a still larger distance than solution node 332.

The depth-first search backtracks to nodes 312, 314, and 316. In this example, node 312 is expanded next because node 312 has a partial distance that is smaller than the distance of solution node 332. However, the nodes 336, 338, 340, and 342 resulting from expanding node 312 have larger partial distances than the distance of solution node 332, and consequently nodes 336, 338, 340, and 342 are pruned. Nodes 314 and 316 similarly have larger partial distances than the distance of solution node 332, and nodes 314 and 316 are pruned. The depth-first search backtracks to nodes 304, 308, and 310. In this example, nodes 304, 308, and 310 are pruned because they have a larger partial distance than the distance of solution node 332. Because no more nodes remain for expansion, the first solution node 332 found is the final candidate.

Figure 4A:
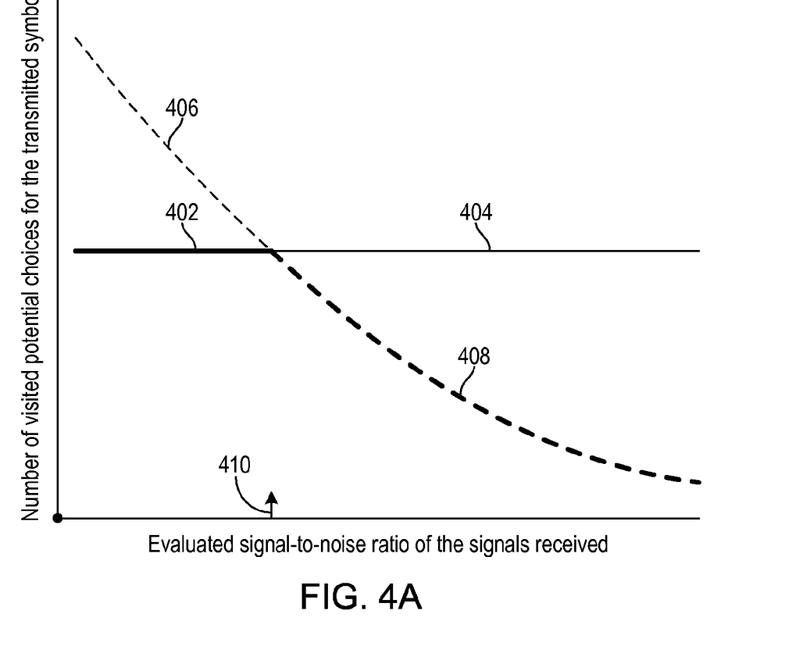
FIGS. 4A and 4B are a plot diagrams illustrating performance versus a signal-to-noise ratio according to various embodiments of the invention.
Figure 4B:
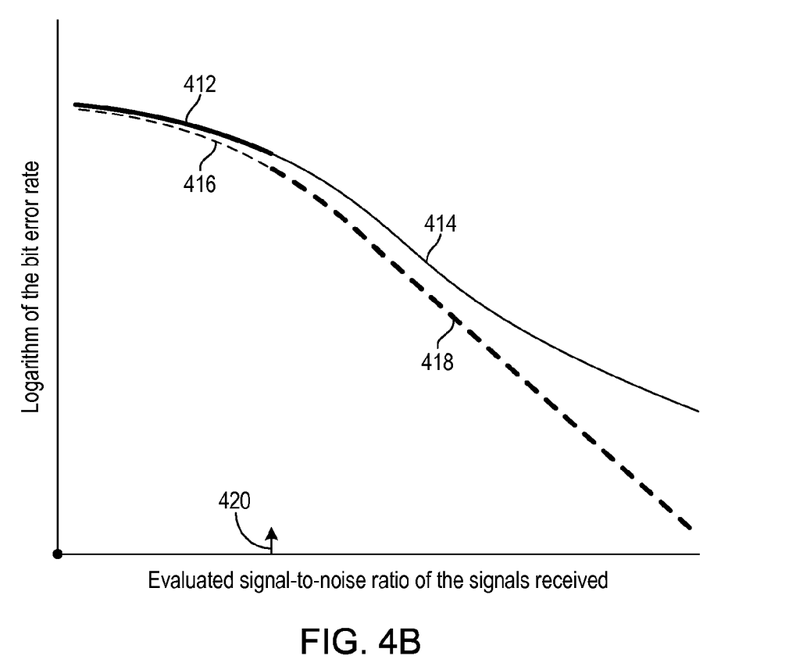

FIGS. 4A and 4B are a plot diagrams illustrating performance versus a signal-to-noise ratio (SNR) according to various embodiments of the invention. FIG. 4A illustrates the effort needed to detect the symbols transmitted versus the SNR, and FIG. 4B illustrates the rate of bit errors from the detected symbols not matching the symbols actually transmitted versus the SNR.

In FIG. 4A, the solid lines 402 and 404, including solid thick line 402 and solid thin line 404, show the number of nodes visited in a search tree for a first detector, and the dashed lines 406 and 408, including dashed thin line 406 and dashed thick line 408, show the number of nodes visited in a search tree for a second detector. In one embodiment, the first detector is a K-best sphere detector and the second detector is a depth-first-search maximum-likelihood detector with pruning. The K-best sphere detector visits a number of nodes that does not vary with the SNR. In contrast, the depth-first-search maximum-likelihood detector visits more nodes when the SNR is low and fewer nodes when the SNR is high.

The threshold 410 is the SNR at which the number of visited nodes is the same for the first and second detectors. In another embodiment, the threshold corresponds to the balance of another measure of detection effort, such as a number of clock cycles required for symbol detection. At an SNR less than the threshold, the K-best sphere detector visits fewer nodes than the depth-first-search maximum-likelihood detector, as shown by solid thick line 402 being below dashed thin line 406. At an SNR greater than the threshold, the depth-first-search maximum-likelihood detector visits fewer nodes than the K-best sphere detector, as shown by dashed thick line 408 being below solid thin line 404.

In one embodiment, the number of nodes visited is reduced during a tree search to detect the transmitted symbols by enabling the first detector and disabling the second detector when the SNR is below the threshold 410 and enabling the second detector and disabling the first detector when the SNR is above the threshold 410. For this composite detector, the thick lines 402 and 408 give the total number of nodes visited versus SNR.

In FIG. 4B, the solid lines 412 and 414, including solid thick line 412 and solid thin line 414, show the bit error rate of a first detector, and the dashed lines 416 and 418, including dashed thin line 416 and dashed thick line 418, show the bit error rate of a second detector. The bit error rate of the second detector is generally less than a bit error rate of the first detector. In one embodiment, the second detector is a maximum-likelihood detector having the theoretically best bit error rate possible, and the first detector is another detector, such as a K-best sphere detector.

In one embodiment, the threshold 420 corresponds to the threshold 410 of FIG. 4A. The thick lines 412 and 418 show the composite bit error rate when the first detector is enabled at an SNR below the threshold 420 and the second detector is enabled at an SNR above the threshold 420. Because the bit error rate of the solid thick line 412 is close to the bit error rate of the dashed thin line 416, the composite bit error rate of solid lines 412 and 418 approaches approximately the bit error rate of the second detector. However, the fixed number of nodes visited by the first detector bounds the number of nodes visited overall. Thus, the bit error rate approaches the bit error rate of a maximum-likelihood detector while bounding the number of nodes visited.

In another embodiment, the threshold 420 corresponds only roughly to the threshold 410 of FIG. 4A. For example, a receiver can estimate the SNR of the received signals and the threshold 420 is the estimate of the SNR that corresponds to the threshold 410 in FIG. 4A. When the SNR is higher than the estimate, the number of potential symbol choices considered by the second detector is smaller than the number of potential symbol choices considered by the first detector.

In yet another embodiment, a depth-first-search maximum-likelihood detector tracks the number of nodes visited, and when a final candidate is not yet determined after visiting a specified number of nodes, the current best solution becomes the final candidate and a K-best sphere detector is activated to detect future symbols until the noise level is reduced. The specified number of nodes for truncating the depth-first search is the amount of searching that is possible before the arrival of the next set of symbols.

Figure 5:
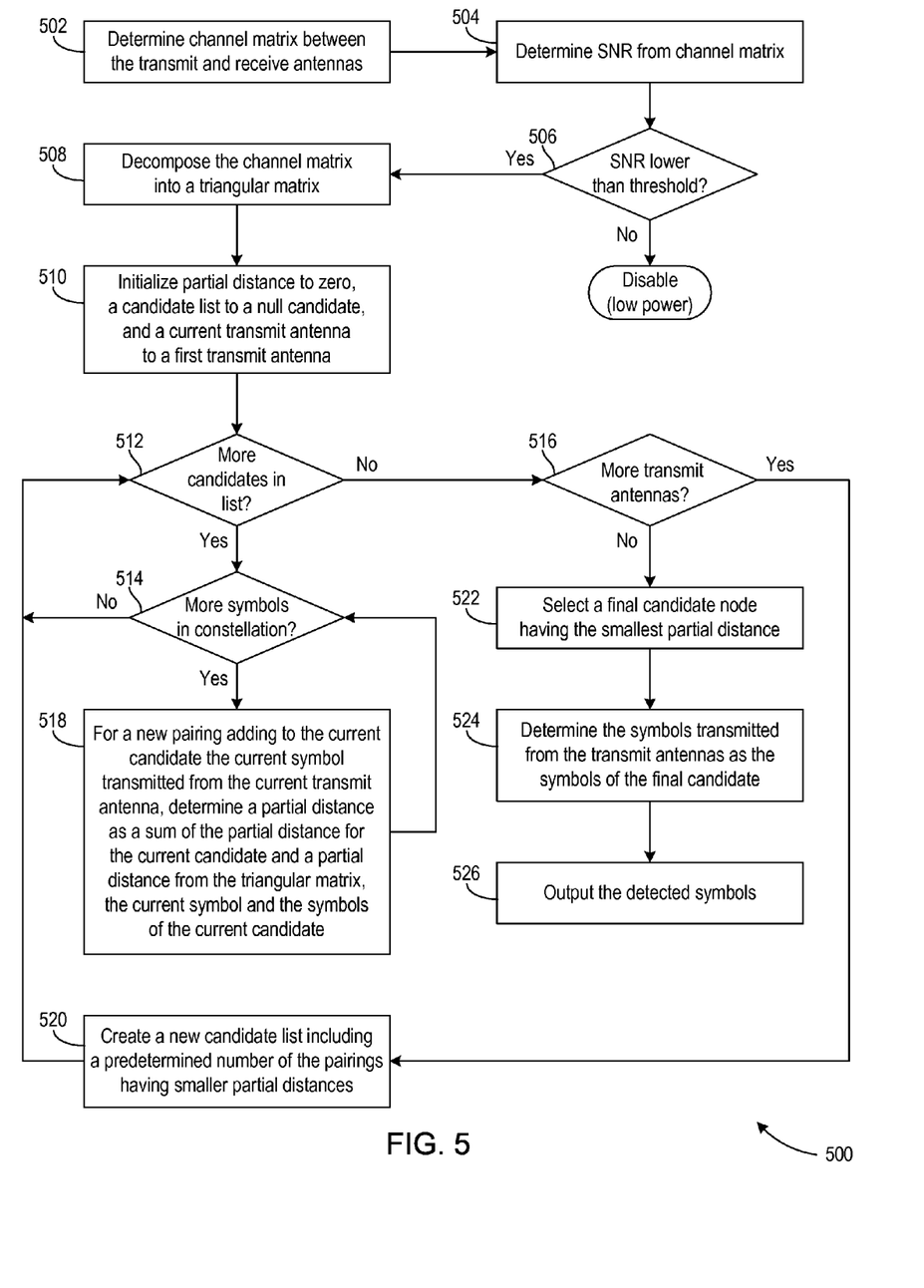
FIG. 5 is a flow diagram of a process for detecting symbols for a low signal-to-noise ratio in accordance with various embodiments of the invention.

FIG. 5 is a flow diagram of a process 500 for detecting symbols for a low signal-to-noise ratio (SNR) in accordance with various embodiments of the invention. Process 500 is enabled when the SNR is lower than a threshold. Process 500 implements a K best sphere detector used in certain embodiments of the invention.

At step 502, process 500 determines a channel matrix between the transmit and receive antennas. At step 504, the SNR is determined from the channel matrix. Decision 506 checks whether the SNR is lower than a threshold. If the SNR is lower than the threshold, process 500 proceeds to step 508. Otherwise, process 500 is disabled and put into a low power mode.

At step 508, the channel matrix is decomposed into a triangular matrix. At step 510, a current partial distance is initialized to a value of zero, a candidate list is initialized to a null root candidate, and a current transmitting antenna is initialized to a first transmitting antenna.

Decision 512 checks whether there are more candidates in the candidate list. If there is another candidate in the candidate list, process 500 proceeds to decision 514; otherwise, process 500 proceeds to decision 516. Decision 514 checks whether there are more symbols in the constellation to pair with the current candidate. If there is another symbol, process 500 proceeds to step 518 and otherwise process 500 returns to decision 512.

At step 518, a partial distance is determined for the pairing of the current candidate and the current symbol in the constellation. The current symbol in the constellation is a potential choice for the symbol actually transmitted from the current transmitting antenna. The partial distance is determined from the partial distance of the current candidate and the received signals.

Decision 516 checks whether there are more transmitting antennas. If there is another transmitting antenna, process 500 proceeds to step 520; otherwise process 500 proceeds to step 522. At step 520, a new candidate list is created that includes a predetermined number of the pairings having the smaller partial distances. Process 500 then returns to decision 512 to process this new candidate list.

At step 522, a final candidate with the smallest partial distance is selected. At step 524, the detected symbols are the symbols included in the final candidate. At step 526, the symbols detected as transmitted from the transmitting antennas are output.

Figure 6:
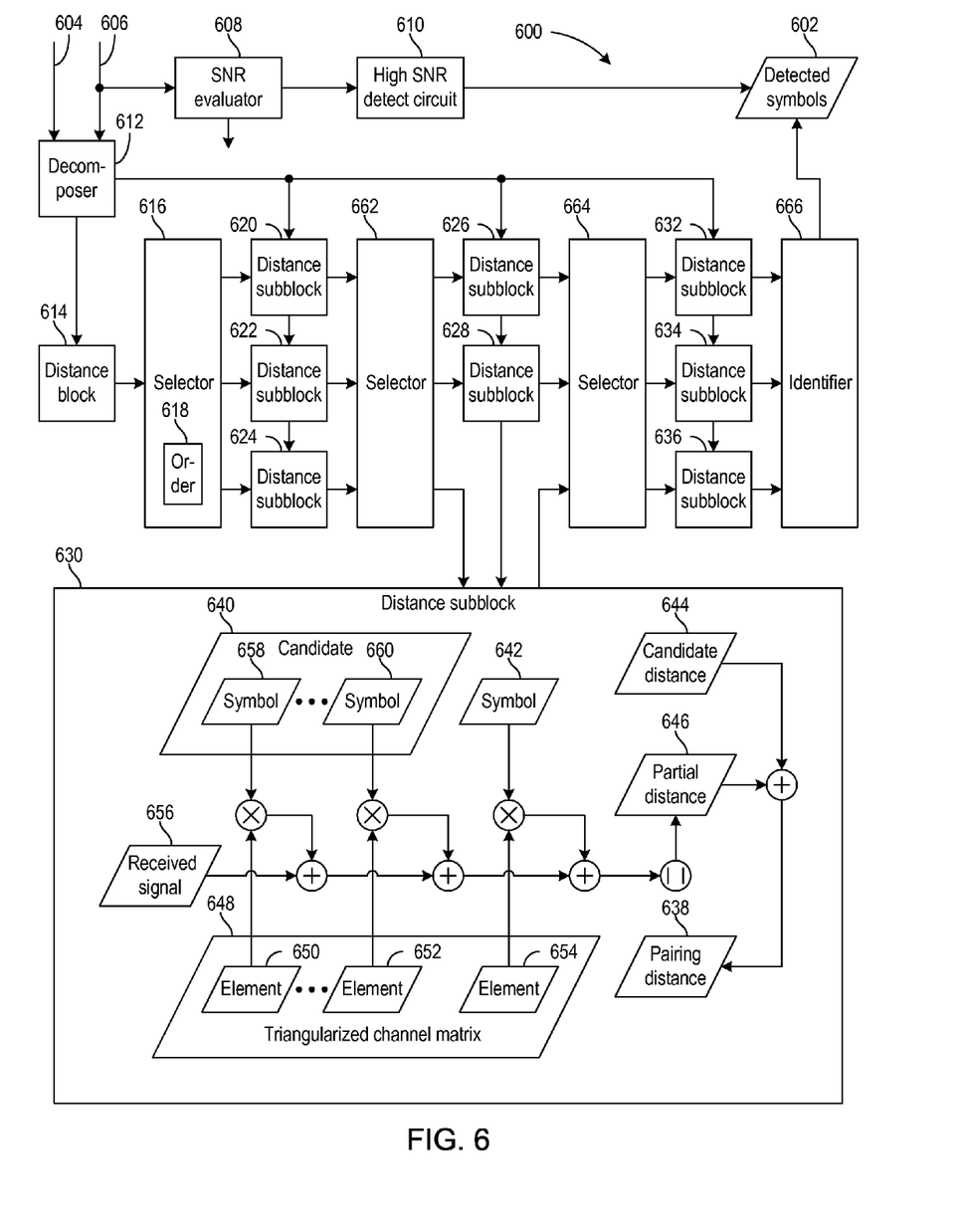
FIG. 6 is a block diagram illustrating a detector of symbols based on signal-to-noise ratio in accordance with various embodiments of the invention.

FIG. 6 is a block diagram illustrating a detector 600 of symbols based on signal-to-noise ratio (SNR) in accordance with various embodiments of the invention. Detector 600 produces detected symbols 602 from the channel matrix on line 604 and the received signals on line 606. A SNR evaluator 608 enables detect circuit 610 when the SNR is above a threshold, and enables the circuitry shown for a K best sphere detector when the SNR is below a threshold.

Decomposer 612 transforms the channel matrix on line 604 into a triangular matrix using a QR decomposition, for example. Decomposer 612 also transforms the received signals on line 606 according to the decomposition of the channel matrix on line 604.

Distance block 614 determines partial distances for a first transmitting antenna transmitting each symbol in a constellation. For this first transmitting antenna, the partial distances give a relative likelihood of the first transmitting antenna transmitting each of the symbols in the constellation. For an example of a constellation that has an order of w symbols, distance block 614 provides w partial norms to selector 616. In one embodiment, distance block 614 determines a partial distance for each pairing of a null candidate and each symbol in a constellation.

Selector 616 selects candidates that have smaller values of the w partial norms. In one embodiment, selector 616 sorts the w partial distances in an ascending order 618 and selects from the beginning of the ascending order 618 a predetermined number of the smallest partial distance. For example, selector 616 selects the three smallest of the w partial distances. The selected candidates are sent to respective distance subblocks 620, 622, and 624. Together, distance blocks 614 and selector 616 form a stage for the first transmitting antenna in the low SNR detector.

Collectively, distance subblocks 620, 622, and 624 form a distance block for a second transmitting antenna, and these subblocks and selector 662 form a stage of the low SNR detector for the first transmitting antenna. The stages are coupled in a sequence as shown.

Each distance subblock 620, 622, or 624 includes a function similar to distance block 614. For example, distance subblock 620 determines partial distances for the second transmitting antenna transmitting each of the w symbols in the constellation along with the first transmitting antenna transmitting the candidate symbol selected by selector 616 for distance subblock 620. Distance subblock 620 calculates the partial distance for each symbol in the constellation as the sum of the partial distance of the candidate from selector 616 and a partial distance for the second transmitting antenna transmitting the symbol. Distance subblock 622 similarly determines partial distances for pairings of a candidate and each symbol in the constellation. Distance subblock 624 similarly expands the candidate selected by selector 616 for distance subblock 624 by adding symbols for the second transmitting antenna to the candidate.

Distance subblocks 626, 628, and 630 collectively form a distance block for a third transmitting antenna, and distance subblocks 632, 634, and 636 collectively form a distance block for a fourth transmitting antenna. Each distance subblock 626, 628, and 630, 632, 634, or 636 determines partial distances for an input candidate paired with symbols transmitted from a corresponding antenna.

Distance subblock 630 determines a partial distance 638 for the pairing of a candidate 640 and each possible symbol 642 in a constellation. For clarity, FIG. 6 shows the calculation of the pairing partial distance 638 for only one symbol 642 in the constellation. The partial distance 638 for the pairing is a sum of a previously determined partial distance 644 for the candidate 640 and a partial distance 646 for the pairing of the candidate 640 and the symbol 642.

The channel matrix on line 604 is transformed into a triangular matrix 648 with a row of elements 650 through 652 and 654 for the transmitting antenna that corresponds to the distance subblock 630. During the transformation of the channel matrix into a triangular matrix, the received signals on line 606 are correspondingly transformed into the received signal 656. The partial distance 646 is a norm of a sum of the transformed received signal 656 and a weighted sum of the symbols 658 through 660 and 642. The symbols 658 through 660 from candidate 640 and the symbol 642 from the constellation have weights given by the row of elements 650 through 652 and 654 in the triangular matrix 648.

Selector 662 selects respective candidates having smaller partial distances for the distance sub-blocks 626, 628, and 630. Selector 664 similarly selects candidates for the identifier block 666.

Identifier block 666 selects the final candidate having the smallest distance among the pairings from distance subblocks 632, 634, and 636. The final candidate corresponds to the selection of a corresponding symbol for each transmitting antenna and these symbols for the transmitting antennas are the detected symbols 602.

Figure 7:
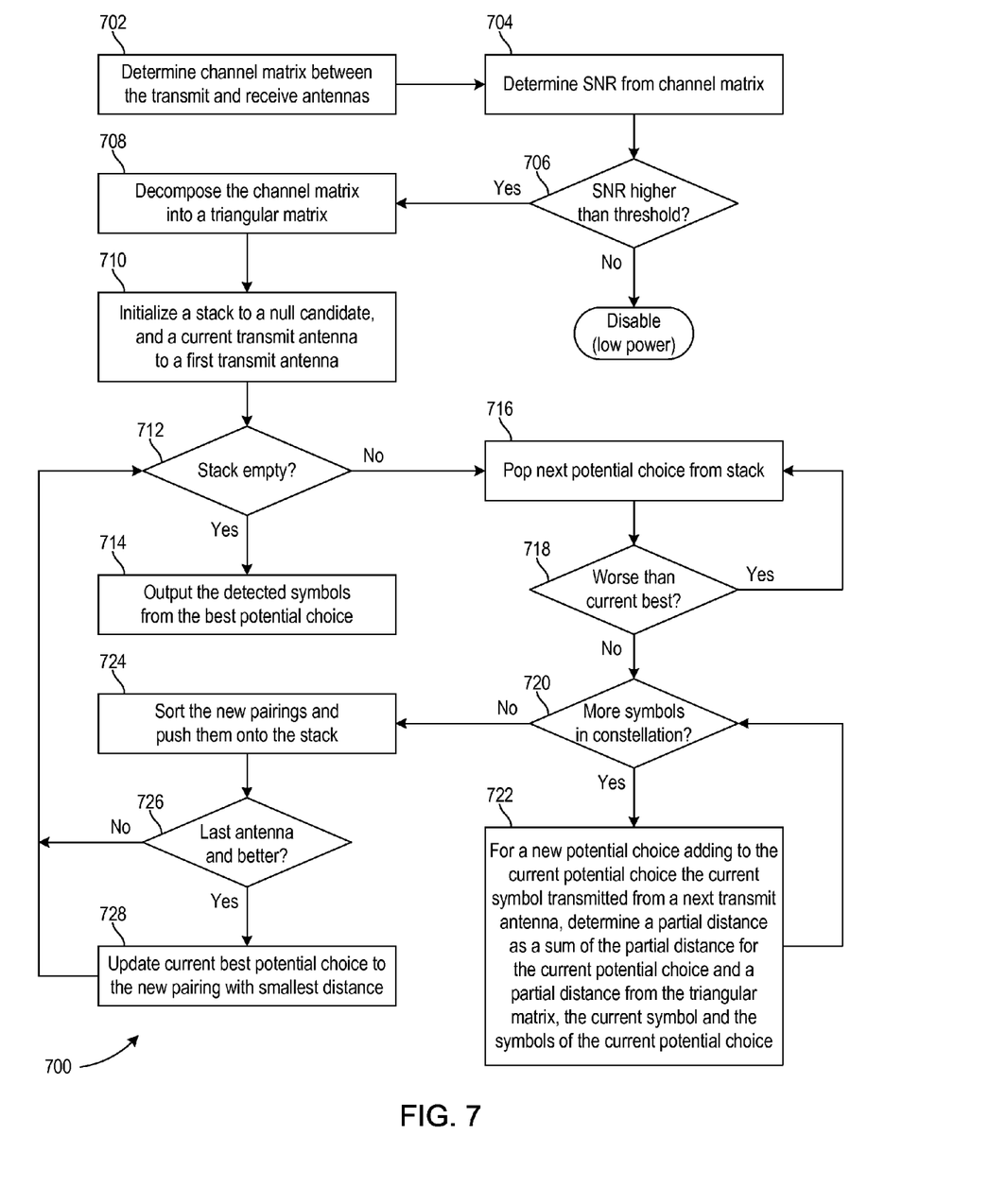
FIG. 7 is a flow diagram of a process for detecting symbols for a high signal-to-noise ratio in accordance with various embodiments of the invention.

FIG. 7 is a flow diagram of a process 700 for detecting symbols for a high signal-to-noise ratio in accordance with various embodiments of the invention. Process 700 is enabled when the SNR is higher than a threshold. Process 700 implements a depth-first-search maximum-likelihood detector used in certain embodiments of the invention.

At step 702, process 700 determines a channel matrix between the transmit and receive antennas. At step 704, the SNR is determined from the channel matrix. Decision 706 checks whether the SNR is higher than a threshold. If the SNR is higher than the threshold, process 700 proceeds to step 708. Otherwise, process 700 is disabled and put into a low power mode.

At step 710, a stack is initialized to a null candidate, and a current transmitting antenna is initialized to a first transmitting antenna. Decision 712 checks whether the stack is empty. If the stack is empty, process 700 proceeds to step 714 and the detected symbols are output. Otherwise, process 700 proceeds to step 716.

At step 716, the next potential choice is popped from the stack and this popped potential choice becomes the current potential choice for expansion. Decision 718 checks whether the partial distance of the current potential choice is greater than the distance of the current best solution. If the current potential choice has a greater partial distance than the distance of the current best solution, than any solution generated by expanding the current potential choice would have a worse distance than the current best solution. Consequently, the current potential choice is pruned by returning to step 716 to pop the next potential choice from the stack. However, if the current potential choice does not have a greater partial distance than the distance of the current best solution, process 700 proceeds to decision 720.

Decision 720 checks whether there are more symbols in the constellation to pair with the current potential choice popped from the stack at step 716. If there is another symbol in the constellation, process 700 proceeds to step 722; otherwise, the current potential choice is fully expanded and process 700 proceeds to step 724. At step 722, a new potential choice is created that adds to the current potential choice the current symbol for a next transmitting antenna of the current potential choice. A partial distance is determined for the new potential choice. This partial distance is a sum of the partial distance of the current potential choice and a partial distance for the current symbol calculated from the received signals, a triangular channel matrix, the current symbol, and the symbols of the current potential choice.

At step 724, all of the new potential choices for the current potential choice are sorted according to the partial distances determined at step 722. The new potential choices are pushed onto the stack in the sorted order with the largest partial distances pushed first onto the stack. Decision 726 checks whether the best of the new potential choices is a better solution than the current best solution. The new potential choice with the smallest partial distance is a better solution if the new potential choice includes a symbol for every transmitting antenna and has a smaller distance than the current best solution. If a better solution is found, the current best solution is updated at step 728. The distance of the updated current best solution is a distance between the symbols of the solution and the signals received at the receiving antennas. The last update of the current best solution at step 728 provides the final solution and the detected symbols.

Figure 8:
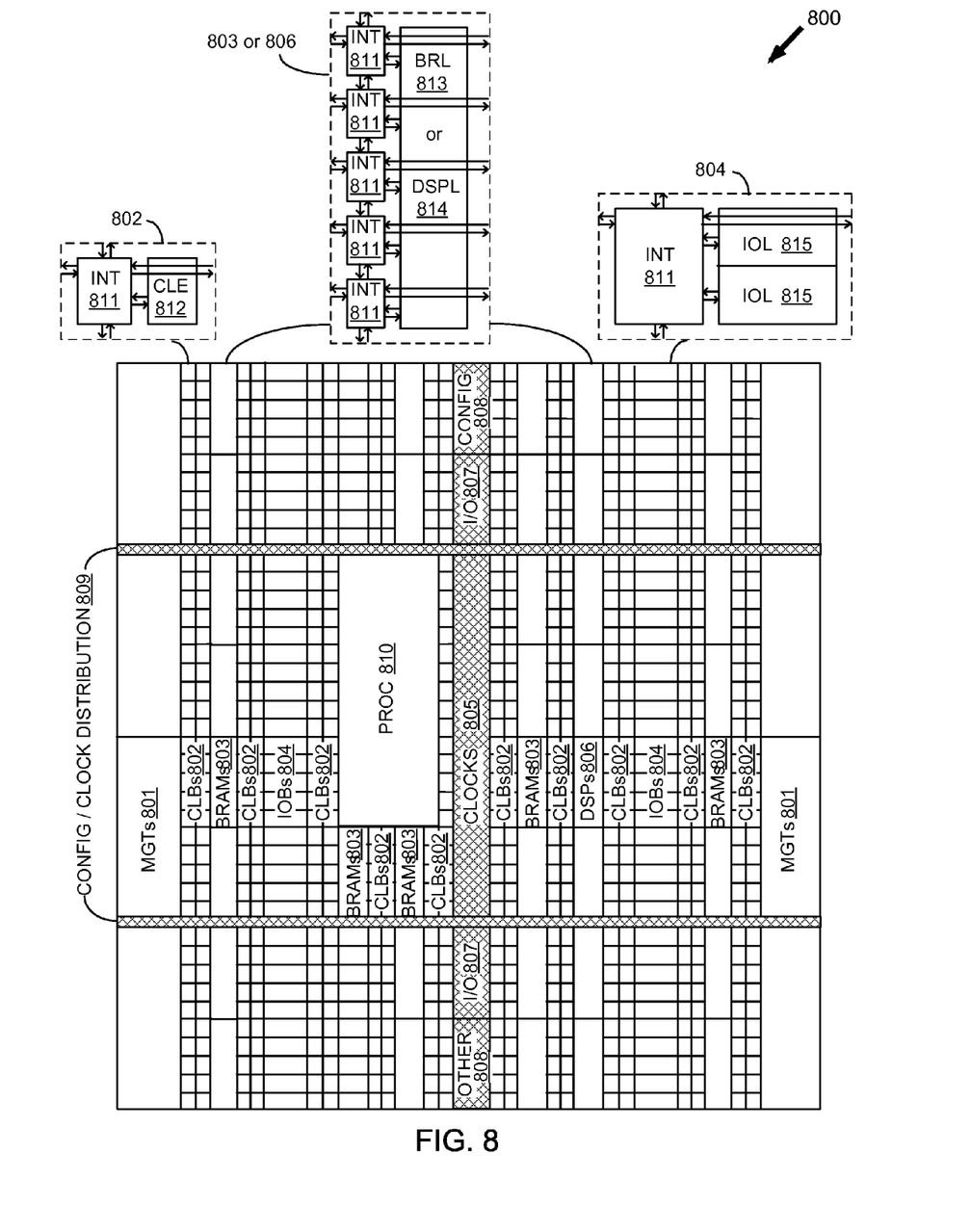
FIG. 8 is a block diagram of a programmable integrated circuit for implementing symbol detection in accordance with one or more embodiments of the invention.

FIG. 8 is a block diagram of a programmable integrated circuit for implementing symbol detection in accordance with one or more embodiments of the invention. The exemplary illustrated circuit is a programmable logic device (PLD), specifically a Field Programmable Gate Array (FPGA). It will be clear to those of skill in the art, however, that the methods of the invention can be practiced using other types of integrated circuits and/or systems. For example, some embodiments of the invention may utilize Application Specific Integrated Circuits (ASICs), non-programmable integrated circuits, partially programmable integrated circuits, and/or electronic systems other than integrated circuits. It will be clear to those of skill in the art that the invention can be implemented within these and other architectural variations.

Advanced programmable logic devices can include several different types of programmable logic blocks in the array. For example, FIG. 8 illustrates an FPGA architecture 800 that includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807) (e.g., configuration ports and clock ports), and other programmable logic 808 such as digital clock managers, analog-to-digital converters, system monitoring logic, and so forth. Some FPGAs also include dedicated processor blocks (PROC 810). In one embodiment, configuration and clocking logic 805 provides means for reconfiguring a programmable integrated circuit to implement the various detectors in the programmable logic blocks during various overlapping or non-overlapping time periods.

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element (INT 811) also includes the connections to and from the programmable logic element within the same tile, as shown by the examples included at the top of FIG. 8.

For example, a CLB 802 can include a configurable logic element (CLE 812) that can be programmed to implement user logic plus a single programmable interconnect element (INT 811). A BRAM 803 can include a BRAM logic element (BRL 813) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element (DSPL 814) in addition to an appropriate number of programmable interconnect elements. An IOB 804 can include, for example, two instances of an input/output logic element (IOL 815) in addition to one instance of the programmable interconnect element (INT 811). As will be clear to those of skill in the art, the actual I/O pads connected, for example, to the I/O logic element 815 typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 9:
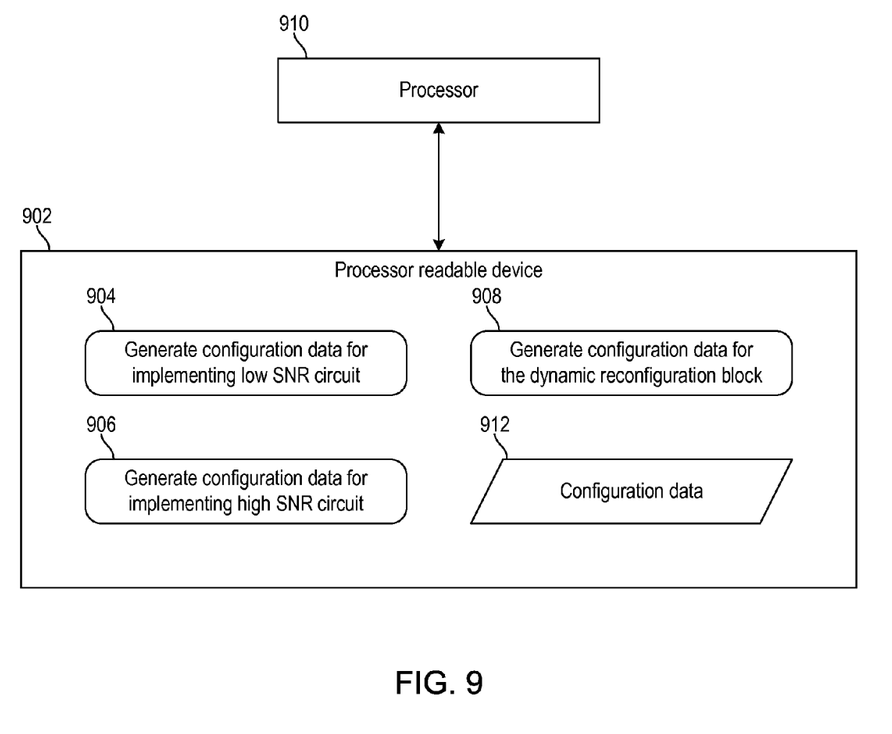
FIG. 9 is a block diagram of a system for generating configuration data for implementing symbol detection in a programmable integrated circuit in accordance with one or more embodiments of the invention.

FIG. 9 is a block diagram of a system for generating configuration data for implementing symbol detection in a programmable integrated circuit in accordance with one or more embodiments of the invention. Processor-readable device 902 is configured with software modules 904, 906, and 908. Execution of the instructions of software modules 904, 906, and 908 by processor 910 causes processor 910 to generate configuration data that implements MIMO symbol detection in a programmable integrated circuit. In one embodiment, the generated configuration data 912 is stored in the processor readable device 902.

Execution of the instructions of software module 904 causes processor 910 to generate configuration data for a detector for a low SNR. Execution of the instructions of software module 906 causes processor 910 to generate configuration data for a detector for a high SNR. Execution of the instructions of software module 908 causes processor 910 to generate configuration data for a dynamic reconfiguration block.

The dynamic reconfiguration block monitors the SNR of the received signals. When the SNR of the received signals drops below a threshold, the dynamic reconfiguration block reconfigures the programmable integrated circuit to implement a detector for a low SNR, such as a K best sphere detector. When the SNR of the received signals rises above a threshold, the dynamic reconfiguration block reconfigures the programmable integrated circuit to implement a detector for a high SNR, such as a depth-first-search maximum-likelihood detector with pruning. In one embodiment, the dynamic reconfiguration block reconfigures the resources within a portion of an array of programmable logic and interconnect resources of the programmable integrated circuit. The two detectors are implemented at in a time-multiplexed manner at various times in overlapping resources within the portion of the array.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for detecting symbols transmitted from multiple transmitting antennas and received at multiple receiving antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for detecting a plurality of symbols communicated from multiple transmitting antennas to multiple receiving antennas, comprising:
    a first detector that determines the symbols from a plurality of respective partial distances of a first plurality of potential choices for at least one of the symbols from a constellation, the first detector determining the respective partial distances from a plurality of signals received at the receiving antennas;
    wherein the first detector comprises a K-best sphere detector;
    a second detector that determines the symbols from a plurality of respective partial distances of a second plurality of potential choices for at least one of the symbols from the constellation, the second detector determining the respective partial distances from the signals, and in response to a signal-to-noise ratio (SNR) of the signals being higher than a threshold the second plurality is fewer in number than the first plurality;
    wherein the second detector comprises a depth-first-search maximum-likelihood detector that prunes each second potential choice having the respective partial distance that is not less than the respective partial distance of one of the second potential choices;
    wherein the one of the second potential choices includes respective symbols for all of the symbols communicated from the transmitting antennas to the receiving antennas;
    wherein the respective partial distance of the one of the second potential choices is a distance between the respective symbols and the signals received at the receiving antennas; and
    an evaluator coupled to the first and second detectors, the evaluator estimating the SNR of the signals received at the receiving antennas, wherein the evaluator enables the first detector to determine the symbols in response to the SNR being lower than the threshold, and the evaluator enables the second detector to determine the symbols in response to the SNR being higher than the threshold.

2. The system of claim 1, wherein the second plurality is larger than the first plurality in response to the SNR being lower than the threshold.

3. The system of claim 1, wherein:
    the second plurality varies with the SNR of the signals, with the second plurality being smaller than the first plurality in response to the SNR being higher than the threshold and the second plurality being larger than the first plurality in response to the SNR being lower than the threshold; and
    the evaluator enables the first and second detectors to determine the respective partial distances for only a smaller of the first and second pluralities at the SNR of the signals, while achieving approximately the bit error rate of the second detector.

4. The system of claim 1, wherein:
    the evaluator puts the second detector into a disabled low-power mode in response to the SNR being lower than the threshold; and
    the evaluator puts the first detector into a disabled low-power mode in response to the SNR being higher than the threshold.

5. The system of claim 1, wherein the first and second detectors are implemented in an array of programmable logic and routing resources of a programmable integrated circuit.

6. The system of claim 5, further comprising a dynamic reconfiguration block adapted to implement the first detector in the array and not to implement the second detector in the array while the SNR is lower than the threshold, and adapted to implement the second detector in the array and not to implement the first detector in the array while the SNR is higher than the threshold.

7. The system of claim 6, wherein the programmable logic and interconnect resources for implementing the first detector overlap the programmable logic and interconnect resources for implementing the second detector.

8. The system of claim 1, wherein the system comprises the first and second detectors in a time multiplexed manner, the system including the first detector and not the second detector during at least a first time period, and the system including the second detector and not the first detector during at least a second time period.

9. The system of claim 1, wherein:
    the first detector includes a plurality of respective stages associated with the transmitting antennas and coupled in a sequence;
    each respective stage other than a final stage in the sequence selects a plurality of candidates and the final stage selects a final candidate in response to the received signals;

each candidate of each respective stage includes a symbol for the respective stage and a symbol for each of the stages that precedes the respective stage in the sequence; and the final candidate includes the symbols detected as communicated from the transmitting antennas to the receiving antennas.

10. The system of claim 9, wherein:

each respective stage other than the final stage includes a distance block and a selector;

the final stage includes a distance block and an identifier block;

the distance block of an initial stage in the sequence determining the respective partial distances of the first potential choices pairing a null candidate with each of a plurality of symbols in the constellation;

the distance block of each respective stage other than the initial stage determines the respective partial distances of the first potential choices pairing each of the candidates of a preceding stage in the sequence and each of the symbols in the constellation:

the selector of each respective stage other than the final stage selects the candidates from the potential choices of the distance block of the respective stage;

the selector selects the candidates as the potential choices having smaller ones of the respective partial distances;

the identifier of the final stage selects the final candidate from the potential choices of the distance block of the final stage; and the identifier selects the final candidate as one of the potential choices having a smaller one of the respective partial distances.

11. The system of claim 10, wherein:

the selector of each respective stage other than the final stage selects the candidates as a predetermined number of the potential choices of the respective stage having smallest ones of the respective partial distances; and the identifier selects the final candidate as one of the potential choices of the identifier having a smallest one of the respective partial distances.

12. The system of claim 11, wherein the predetermined number of the potential choices for each respective stage other than the final stage is a same number for every one of the respective stages except the final stage.

13. An article of manufacture, comprising:

a processor-readable device configured with instructions for generating configuration data for a programmable integrated circuit, wherein execution of the instructions by a processor causes the processor to generate the configuration data, and configuring the programmable integrated circuit with the configuration data causes the programmable integrated circuit to implement:

a first detector that determines the symbols from a plurality of respective partial distances of a first plurality of potential choices for at least one of the symbols from a constellation, the first detector determining the respective partial distances from a plurality of signals received at the receiving antennas, the first detector enabled to determine the symbols in response to a signal-to-noise ratio (SNR) of the signals being lower than a threshold;

wherein the first detector comprises a K-best sphere detector;

a second detector that determines the symbols from a plurality of respective partial distances of a second plurality of potential choices for at least one of the symbols, the second detector determining the respective partial distances from the signals, the second detector enabled to determine the symbols in response to the SNR being higher than the threshold, and the second plurality is smaller than the first plurality in response to the SNR being higher than the threshold;

wherein the second detector comprises a depth-first-search maximum-likelihood detector that prunes each second potential choice having the respective partial distance that is not less than the respective partial distance of one of the second potential choices;

wherein the one of the second potential choices includes respective symbols for all of the symbols communicated from the transmitting antennas to the receiving antennas; and wherein the respective partial distance of the one of the second potential choices is a distance between the respective symbols and the signals received at the receiving antennas.

14. The article of manufacture of claim 13, wherein the configuring of the programmable integrated circuit with the configuration data further causes the programmable integrated circuit to implement a dynamic reconfiguration block adapted to implement the first detector in the programmable integrated circuit and not to implement the second detector in the programmable integrated circuit while the SNR is lower than the threshold, and further adapted to implement the second detector in the programmable integrated circuit and not to implement the first detector in the programmable integrated circuit while the SNR is higher than the threshold.

15. The article of manufacture of claim 14, wherein:

the first and second detectors are each implemented in the programmable integrated circuit within an array of programmable logic and interconnect resources of the programmable integrated circuit; and the programmable logic and interconnect resources for implementing the first detector overlap the programmable logic and interconnect resources for implementing the second detector.

16. The article of manufacture of claim 13, wherein:

the second plurality varies with the SNR of the signals, with the second plurality being smaller than the first plurality in response to the SNR being higher than the threshold and the second plurality being larger than the first plurality in response to the SNR being lower than the threshold; and the first and second detectors are enabled to determine the respective partial distances for only a smaller of the first and second pluralities at the SNR of the signals, while achieving approximately the bit error rate of the second detector.

17. A system for detecting a plurality of symbols from a constellation that are communicated from multiple transmitting antennas to multiple receiving antennas, comprising:

means for evaluating a signal-to-noise ratio (SNR) of signals received at the receiving antennas;

first means for detecting the symbols from the signals in response to the SNR being lower than a threshold; and second means for detecting the symbols from the signals in response to the SNR being higher than the threshold, wherein:

a bit error rate of the second means is less than a bit error rate of the first means, and the second means performs fewer calculations than would the first means in response to the SNR being higher than the threshold and the first means performs fewer calculations than would the second means in response to the SNR being lower than the threshold.

18. The system of claim 17, further comprising means for reconfiguring a programmable integrated circuit to implement the first means during a first time period and the second means during a second time period.

* * * * *